(12) United States Patent
Haggerty

(10) Patent No.: US 6,354,642 B1
(45) Date of Patent: Mar. 12, 2002

(54) PULLER AND LOCATOR FOR TRAILER TANDEM AXLE UNITS

(76) Inventor: Scotty E. Haggerty, P.O. Box 586, Cuba, IL (US) 61427

( * ) Notice: Subject to any disclaimer, the term of this patent is extended or adjusted under 35 U.S.C. 154(b) by 0 days.

(21) Appl. No.: 09/656,175

(22) Filed: Sep. 6, 2000

Related U.S. Application Data
(60) Provisional application No. 60/154,042, filed on Sep. 16, 1999.

(51) Int. Cl.$^7$ .............................................. B62D 33/08
(52) U.S. Cl. ........................ 294/19.1; 294/24; 180/209; 280/149.2
(58) Field of Search ........................... 294/18, 19.1, 24; 280/149.2, 407.1, 433, 438.1, 441; 180/209; 213/205–207

(56) References Cited

U.S. PATENT DOCUMENTS

| | | | |
|---|---|---|---|
| 3,618,969 A | | 11/1971 | Glassmeyer |
| D289,360 S | | 4/1987 | Westcott |
| 5,065,488 A | | 11/1991 | Chapman et al. |
| 5,199,732 A | | 4/1993 | Lands et al. |
| 5,326,144 A | | 7/1994 | Forcier |
| 5,449,190 A | | 9/1995 | Ford |
| 5,564,725 A | | 10/1996 | Brazeal |
| 5,617,072 A | * | 4/1997 | McNeal ...................... 280/441 |
| 5,678,834 A | | 10/1997 | Wise |
| 5,833,253 A | | 11/1998 | Hess |
| 6,279,932 B1 | * | 8/2001 | White et al. ............. 280/149.2 |

FOREIGN PATENT DOCUMENTS

| | | |
|---|---|---|
| CA | 566681 | 11/1958 |
| GB | 584416 | 1/1947 |

* cited by examiner

Primary Examiner—Dean J. Kramer
(74) Attorney, Agent, or Firm—Richard C. Litman

(57) ABSTRACT

A portable combination tool for use by truckers provides several functions in a single device. The present tool essentially comprises a telescoping tubular assembly, with the smaller diameter tube or rod being adjustably positionable within the larger tube. The smaller rod or tube attaches to the structure of an adjustably positionable tandem axle unit on a semitrailer, with the tool providing for the release of the lock pin handle of the tandem unit. A spring extends from the larger diameter handle portion of the tool, and is secured to the release pin handle of the tandem unit. The handle portion of the tool is extended to apply a tensile force to the release handle through the spring, with the driver then moving the truck and trailer slightly to release any shear frictional loads on the release pins, causing the release handle to release due to the spring tension of the tool. A locator may also be used with the present tool to provide a remote indication of the proper repositioning of the tandem axle unit to the predetermined position desired by the driver, while the driver remains in the cab. The present tool may also be used to release the fifth wheel release mechanism of the tractor unit, for unhitching a semitrailer therefrom, with the release hook also serving as a device for breaking trailer door latch seals. The elongate configuration of the tool provides utility as a "tire thumper" for providing a rough check of tire inflation, as well.

20 Claims, 5 Drawing Sheets

PULLER AND LOCATOR FOR TRAILER TANDEM AXLE UNITS

REFERENCE TO RELATED PATENT APPLICATION

This application claims the benefit of U.S. Provisional Patent Application Serial No. 60/154,042, filed on Sep. 16, 1999.

BACKGROUND OF THE INVENTION

1. Field of the Invention

The present invention relates generally to tools and equipment used in the trucking industry, and more specifically to a combination device for pulling the lock pin handle for a longitudinally adjustable tandem axle unit on a semitrailer. The present invention also serves to indicate the desired position for the tandem unit as the trailer is moved, and other functions.

2. Description of the Related Art

Many semitrailers are equipped with longitudinally adjustable tandem axle assemblies, where the position of the tandem unit may be adjusted over some range in order to better distribute the load over the wheels, support the rear of the trailer during loading, or for other reasons. These tandem axle units are normally secured to the trailer subframe by a series of large, heavy spring loaded pins which project laterally through mating passages in the subframe and tandem axle unit, with a handle being provided to release the pins for tandem adjustment.

However, the shear force on the pins, particularly when the pins are somewhat worn and grooved, along with the spring tension urging the pins into their locked position, result in it being necessary to apply a fair amount of force to the handle while rocking the trailer in order to release the pins. In the past, a driver has required the assistance of a second party to pull on the tandem release handle, while the driver maneuvers the truck back and forth. This is potentially dangerous to the assistant unless all parties involved know precisely what they are doing and communicate well, as the person pulling the release handle is very close to the left side dual tandem wheels of the assembly. Even though the wheels should not move appreciably, there is always the possibility of contact with the wheels by the assistant.

Accordingly, tools have been developed in the past to apply a releasing force to the release handle while the driver repositions the truck from the cab. Even with the use of such a tool, the driver may be required to make several trips in and out of the cab to check on the progress of the operation, as he must (1) attach the tool to apply a tensile force to the handle, (2) return to the cab to rock the trailer, (3) perhaps leave the cab to see if the rocking action has released the pins, (4) return to the cab to move the tractor and trailer relative to the tandem axle assembly, (5) leave the cab to check on the relative position of the tandem assembly, release the unlocking force on the lock pin handle as required, and remove the tool, (6) return to the cab to move the tractor and trailer slightly to cause the pins to lock the tandem assembly in its new desired position, (7) leave the cab to confirm that the tandem is locked in position as desired, and (8) finally return to the cab for the drive. Moreover, it may be necessary for the driver to repeat steps (2) and (3) one or more times, if the initial rocking of the truck has failed to release the tandem locking pins. This operation is very frustrating for truckers, as they are normally paid by the mile, and the loss of five, ten, or fifteen minutes or more while attempting to adjust the position of the tandem unit on their trailer, eats up a substantial fraction of time which they could be spending on the road.

Even if the driver is aware of the release of the locking pins for the tandem axle unit and proceeds to reposition the tractor and trailer relative to the tandem, the driver still must leave the cab to check the position of the tandem. If the driver has not moved the tractor and trailer sufficiently far, or has moved the rig too far, then he must return to the cab and move the tractor and trailer again in an attempt to position the tandem unit at least close to the desired position so he can release the unlocking position of the lock pin release handle and begin the trip.

It will be seen that the positional adjustment of a tandem axle unit on a semitrailer is a major hassle for a truck driver, even where a tool is applied to the lock pin release handle for pulling the release handle automatically. Accordingly, a need will be seen for a puller and locator tool for use with tandem axle units of semi trailers, which tool serves to automatically apply a release force to the tandem lock pin release handle and also indicates the proper repositioning of the tandem unit to the desired position. With the use of the present tool, the driver need only attach the tool to the tandem unit and lock pin release handle and secure the locator to the trailer as desired, return to the cab to maneuver the tractor and trailer to release the lock pins, move the tractor and trailer the predetermined distance to reposition the tandem unit as desired (the desired position is indicated by the locator of the present tool), and leave the cab a second time to remove the tool and locator respectively from the tandem axle unit and trailer. The present release handle puller and tandem locator tool thus saves a considerable amount of time for a driver, and also provides other functions as well (i.e., an accessory permits it to be used to pull the release for the fifth wheel coupling of the tractor).

A discussion of the related art of which the present inventor is aware, and its differences and distinctions from the present invention, is provided below.

U.S. Pat. No. 3,618,969 issued on Nov. 9, 1971 to John J. Glassmeyer, titled "Apparatus For Positioning Trailer Suspension Frame," describes an automated mechanism for releasing the lock pin handle from its pulled position when the tandem axle unit has been repositioned to the desired location. The Glassmeyer mechanism goes beyond the scope of the present invention, in that it automatically releases the unlocking force on the lock pin handle to allow the lock pins to engage the desired corresponding holes in the trailer subframe. However, the Glassmeyer mechanism is a permanent installation and is integrated with the trailer; it cannot be removably applied to a trailer as a portable tool which is retained by the driver, as is the case with the present puller and locator tool. While a driver who drives for a company whose trailers are equipped with the Glassmeyer mechanism would enjoy its benefits, the mechanism does nothing for drivers who have occasion to pull trailers not equipped with the Glassmeyer apparatus.

U.S. Pat. No. 5,065,488 issued on Nov. 19, 1991 to Richard L. Chapman et al., titled "Tandem Axle Trailer Pin Extracter Device," describes a portable device generally comprising a tube with an internal spring and handlebars projecting therefrom. The spring provides a tensile force for hooks which project from opposed slots in the sides of the tube, with the handlebars being connected to the opposite end of the spring and projecting from the slots. The hooks are secured to the tandem lock pin release handle of the trailer, and the handlebars pulled and secured in retainer grooves at the opposite end of the slot, with the spring thus providing a tensile force on the lock pin release handle. The Chapman et al. device has no means of securing positively to the tandem axle slider frame, and thus requires a separate brace arm which bears against the ground while the tool is installed. In contrast, the present tool attaches securely to the tandem slider frame adjacent to the lock pin release handle, and does not require any additional attachment means or bracing. Also, the present tool is adjustable in length, to allow for different distances between the tandem slider frame and the outer edge of the trailer where the present tool may be manipulated and observed from the cab. Moreover, Chapman et al. describe the removal of their tool from the trailer once the lock pin release handle has been pulled, leaving the driver to guess at the amount of movement required to reposition the trailer body relative to the tandem axle unit. The locator provided with the present tool provides a positive indication to the driver that the trailer has been moved the desired amount, with the driver being able to observe this indication from the cab.

U.S. Pat. No. 5,199,732 issued on Apr. 6, 1993 to Herbert D. Lands et al., titled "Apparatus For Unlocking A Bogie On A Tractor-Trailer Rig," describes a permanently installed, pneumatically powered system for providing the required force for releasing the tandem locking pins. FIG. 2 of the Lands et al. disclosure illustrates an exemplary mechanism for retracting and extending the tandem unit locking pins, as is known in the art and which mechanism is operated by the tool of the present invention. While Lands et al. provide various other features, such as automatic pin extension in the event of the emergency brakes of the tandem unit being disengaged during operation, the mechanism is not portable in the sense that it cannot be quickly removed from the tandem unit by hand, without the use of tools, and carried by the driver in the cab of the truck. Also, Lands et al. do not address the problem of precisely locating the tandem unit as desired in its new position relative to the trailer, as provided by the locator of the present tandem axle unit repositioning tool.

U.S. Pat. No. 5,326,144 issued on Jul. 5, 1994 to Clarence D. Forcier, titled "Semitrailer Sliding Tandem Pin Puller," describes a device similar to that of the '488 U.S. Patent to Chapman et al., discussed further above. The Forcier device comprises a tube with a coil spring installed concentrically therein, with a loop at the end of the spring for connecting to the locking pin release handle and a clamp at the end of the tube for securing the device to the edge of the trailer. Forcier also provides an optional flag or marker which extends past the end of the tube as the spring retracts when the lock pin handle is pulled for release. However, it is noted that the Forcier device secures to the trailer, rather than securing to the frame of the tandem wheel assembly. This will result in the device becoming overextended and possibly pull it loose from the trailer if the driver continues to move the trailer after the lock pins are pulled, as the spring attachment will remain with the lock pin handle while the opposite trailer attachment end moves with the trailer. Thus, a driver using the Forcier device would be required to leave the cab and remove the device once the pins are pulled to free the tandem axle unit. The driver would still be left to guess as to the position of the tandem unit for repositioning the unit, with multiple attempts perhaps being required to position the tandem unit as desired. The locator of the present tool does not provide an indication when the release handle is released, as does the Forcier tool, but does provide an indication when the tandem unit has been properly repositioned, which Forcier does not.

U.S. Pat. No. 5,449,190 issued on Sep. 12, 1995 to William G. Ford, titled "Trailer Pin Puller," describes a device which secures to the lock pin release handle and trailer side in much the same manner as the Forcier device discussed immediately above. However, the Ford device includes a threaded advance shaft connected to the outboard end of the spring (i.e., opposite its attachment end to the pin release handle), with which the tension on the spring may be adjusted. The same problems as addressed in the discussion of the Forcier device are seen to exist with the Ford device, i.e., part of the tool is connected to the tandem unit, while the other part is connected to the trailer. The device must be disconnected from the handle and trailer after the lock pins have been released and before the trailer is repositioned on the tandem unit, in order to avoid pulling the device loose.

U.S. Pat. No. 5,564,725 issued on Oct. 15, 1996 to Russell S. Brazeal, titled "Pneumatically Operated Slider Locking Mechanism," describes a pneumatically powered assisting device for operating the otherwise conventional mechanism for retracting and extending the locking pins for a tandem axle unit. Pulling the release handle actuates the pneumatic system, which provides pneumatic pressure to retract the pins. The Brazeal pneumatic system thus teaches away from the present tool, as Brazeal does not require any form of external tensile spring pressure to pull the handle, due to the pneumatic assist. Also, the Brazeal system is. permanently installed on the trailer and relies upon the integral pneumatic system of the trailer, unlike the present portable tool.

U.S. Pat. No. 5,678,834 issued on Oct. 21, 1997 to Glenn Wise, titled "Tandem Positioning Assist Tool," describes a device for applying tensile force to the lock pin release handle on a tandem axle unit of a semitrailer. The device comprises a relatively bulky, generally rectangular frame which is unfolded and removably secured to the tandem subframe. Different bases for the frame allow it to be used with different types of trailers which have different lock pin release handle systems. Wise also provides for an indicator to show the driver in the cab when the handle has moved, to indicate the release of the lock pins. However, the Wise device does not provide any indication of the proper repositioning of the tandem axle unit once the pins have been released. The driver must guess at the proper position, which may require two or three trips from the cab to the trailer, using the Wise device. In contrast, the present tool provides an accurate indication when the tandem unit has been repositioned to the desired location, which feature is not found in any other tandem axle adjustment tools known to the present inventor.

U.S. Pat. No. 5,833,253 issued on Nov. 10, 1998 to Timothy V. Hess, titled "Locking Mechanism For Movable Subframe Of Tractor-Trailers," describes a system more closely related to the pneumatically powered system disclosed in the Brazeal '725 U.S. Patent, than to the present invention. As in the Brazeal system, the Hess system is a permanently installed device integral with the trailer, rather than being a portable, manually operated tool as in the present puller and locator tool.

U.S. Pat. No. D-289,360 issued on Apr. 21, 1987 to Orville H. Westcott, titled "Truck Tool," illustrates a design comprising a flat bar with a hook at each end, and a narrow plate extending from one end and perpendicular to the plane of the bar. The Westcott Design Patent provides no indication of function for the device, and no spring means for applying tensile force to the lock pin release handle of a tandem axle unit, nor indicator means for indicating when the tandem unit is properly positioned, are apparent in the Westcott disclosure.

British Patent Publication No. 584,416 accepted on Jan. 14, 1947 to Ensor Caravans Ltd., titled "Improvements In Trailers And Like Road Vehicles," describes a light trailer frame having a single longitudinally adjustable axle. The position of the axle is adjusted by a crank mechanism at one end of the trailer. The '416 British Patent Publication teaches away from the present tool, as no release handle is required with the mechanism of the British Patent Publication. The threaded shaft of the crank mechanism provides sufficient frictional force to preclude movement of the assembly, without need for locking pins as found in larger semitrailer tandem axle units.

Finally, Canadian Patent Publication No. 566,681 issued on Nov. 25, 1958 to Charles B. Sheppard et al., titled "Pre-Selector For Positioning Running Gear Relative To Trailer Body Load," describes a tandem axle adjustment mechanism which is permanently installed and integrated with the trailer assembly, unlike the present portable tool. Rather than providing an indicator or locator to show when the tandem unit has been repositioned at the desired location beneath the trailer, Sheppard et al. provide a mechanism which automatically resets the lock pins according to prior adjustment when the tandem unit is repositioned to the predetermined location. Otherwise, the Sheppard et al. mechanism is more closely related to the permanently installed, integral mechanisms of the U.S. Patents to Lands et al., Brazeal, and Hess, than to the present portable puller and locator tool for semi trailer tandem axle units.

None of the above inventions and patents, taken either singly or in combination, is seen to describe the instant invention as claimed.

SUMMARY OF THE INVENTION

The present invention comprises a portable tool for pulling the lock pin release handle for adjusting the position of a tandem axle unit on a semitrailer. The present tool is actually a combination device, and may be used as a locating device for remotely indicating the predetermined proper position of the tandem unit during adjustment, thus precluding need for the driver to repeatedly leave the cab to check the position of the tandem unit during adjustment. The present tool may further include means for pulling the release mechanism on the fifth wheel of the tractor, and its elongate configuration allows it to be used as a "tire thumper," for providing a rough idea of tire inflation.

The present tool comprises an elongate telescoping tube having a smaller diameter tube or rod whose distal end temporarily secures to the tandem axle unit of the semitrailer for use in pulling the lock pin release handle thereof. The larger diameter tube includes a slot with a series of detents therein, into which a mating pin extending from the smaller diameter rod or tube may be selectively placed to adjust the overall length of the device. A spring extends from near the handle end of the larger diameter tube, and is removably secured to the lock pin release handle of the trailer. By adjusting the telescoped length of the tool, tension is applied to the spring and thus to the lock pin release handle, urging it from its locked position when any shear force being applied to the lock pins is released by slight movement of the truck and trailer.

The present tool may also be used to determine the proper repositioning of the tandem axle unit. A marker is suspended from the side of the trailer opposite the desired relocation point of the axle unit, where that point will be substantially aligned with the lock pin release handle. When the trailer is moved (either forwardly or rearwardly) to the point where the indicator contacts the puller tool handle, this condition is observable from the cab, indicating that the tandem unit has been relocated to substantially the proper position. Alternatively, the locator may be suspended on a line having a length extending below the tool, substantially equal to the distance which the tandem unit must be moved. When the locator line drags across the tool until the locator reaches the handle, the driver knows the proper position has been reached.

The larger diameter or handle portion of the present tool may further include a hook extending therefrom, for reaching the release rod for the fifth wheel of the tractor. Thus, the present tool may be used as a release for the semitrailer connected to the tractor, in addition to the other functions described above, thereby eliminating the need for a trucker to carry multiple tools for accomplishing the multiple tasks which may be handled by the present combination tool.

Accordingly, it is a principal object of the invention to provide an improved tool for use in remotely pulling the lock pin release handle for an adjustably positionable tandem axle unit in a semitrailer.

It is another object of the invention to provide an improved tool for such use, including locator means for determining the proper repositioning of the tandem axle unit to the desired predetermined position.

It is a further object of the invention to provide an improved lock pin release handle puller and tandem unit locator tool, including means for releasing the release rod for the fifth wheel of a truck tractor unit.

An additional object of the invention is to provide an improved tool including means for adjusting the length thereof for different spans between the lock pin release handle and trailer side in different trailers.

Still another object of the invention is to provide an improved tool which is portable and easily carried by a truck driver.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a combination tool for use in the trucking industry, for pulling the release pin handle on an adjustably positionable trailer tandem axle unit and for locating the precise relocation of the tandem unit as predetermined by the driver. The present tool also includes a hook for accessing the release rod for the fifth wheel of the truck tractor for releasing a trailer therefrom, and may be used as a "tire thumper" as well.

Figure 1:
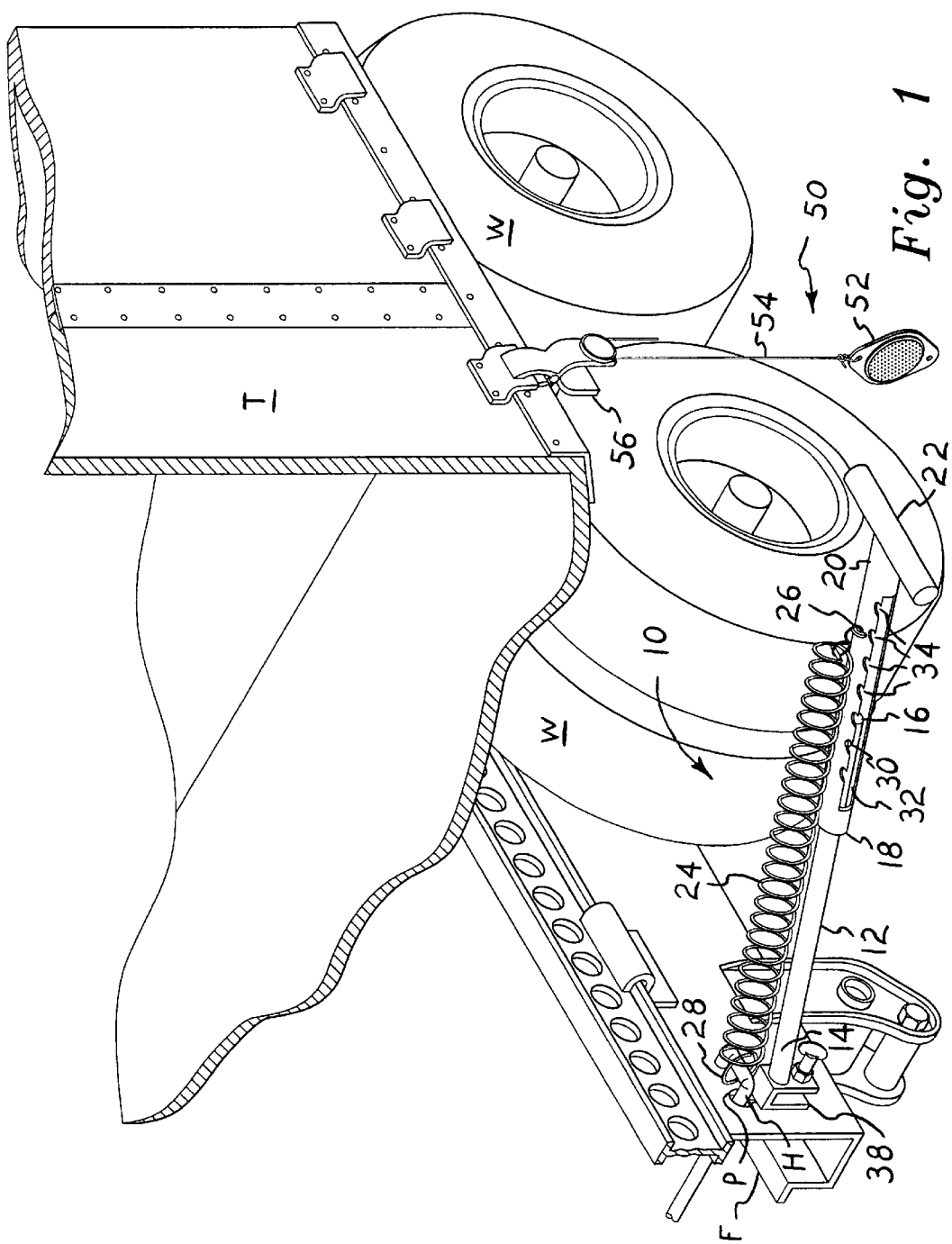
FIG. 1 is an environmental perspective view of the present release handle puller and locator tool temporarily and removably secured to the tandem axle unit of a trailer, showing its general configuration and function.
Figure 2:
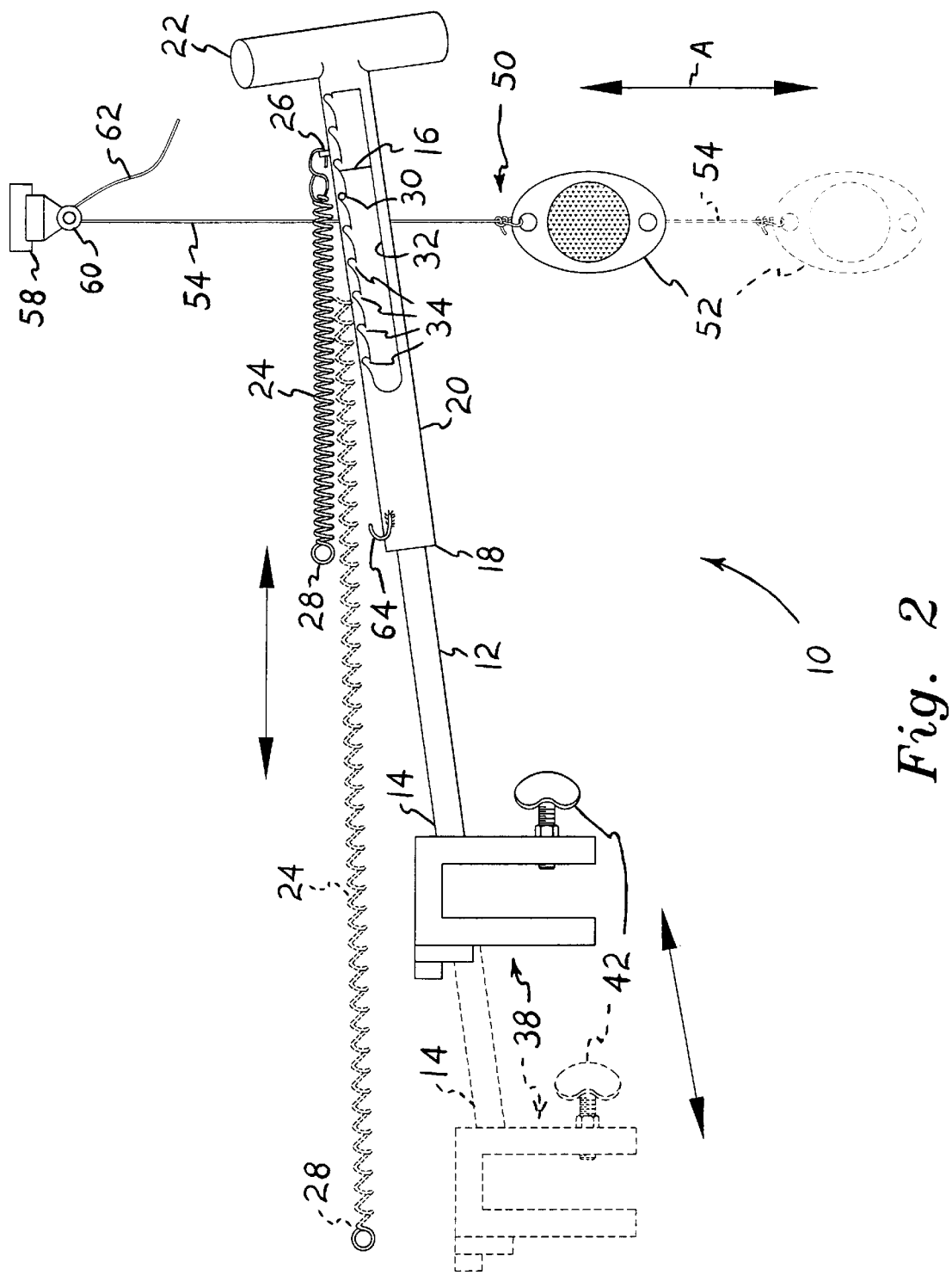
FIG. 2 is a side elevation view of the present puller and locator tool, showing further details of its construction and operation.

The use of the present tool 10 is shown in FIG. 1 of the drawings, with details illustrated in FIG. 2. The tool 10 is temporarily and removably attached to the longitudinally adjustable subframe F of the tandem axle wheel unit W of a truck semitrailer T, and is exerting a tensile force upon the release pin handle H for the tandem axle wheel unit W. The tool 10 comprises an elongate rod 12 having a distal tandem axle attachment end 14, with an opposite adjustment end 16 which is telescopingly and adjustably installed through the rod opening end 18 of a tube 20. The attachment end 14 of the tube 12 includes means for temporarily and removably securing the tool 10 to the subframe F of the tandem axle wheel unit W of the trailer T, which means is discussed in detail further below. The tube 20 has a T handle 22 opposite the rod opening end 18, for the driver to handle and manipulate the tool 10. A tension spring 24 extends from an external attachment point 26 on the tube 20, with the spring 24 having an opposite distal end with a ring 28 for temporarily and removably securing the spring 24 to the lock pin release handle H by passing the ring 28 therearound.

The rod 12 and tube 20 are telescopingly adjustable relative to one another, as noted above. The position of the rod 12 relative to the tube 20 may be locked by means of a pin 30 which extends radially from a point along the adjustment end 16 of the rod 12, and which rides in a longitudinal slot 32 cut in the side of the tube 20. A series of detents 34 are formed along at least one side of the slot 32, for accepting the locking pin 30 of the rod 12. Thus, the trucker may hook the ring 28 of the spring 24 to the release pin handle H, secure the attachment end 14 of the rod 12 to the adjustable tandem wheel unit W as discussed further below, and extend the tubular handle portion 20 of the tool to exert a tensile force on the release handle H, generally as shown in FIG. 1 of the drawings. The desired force may be locked into place by pulling the T handle 22 of the tool 10 outwardly, and twisting the handle 22 slightly to engage the locking pin 30 in one of the detents 34 as desired.

Figure 3:
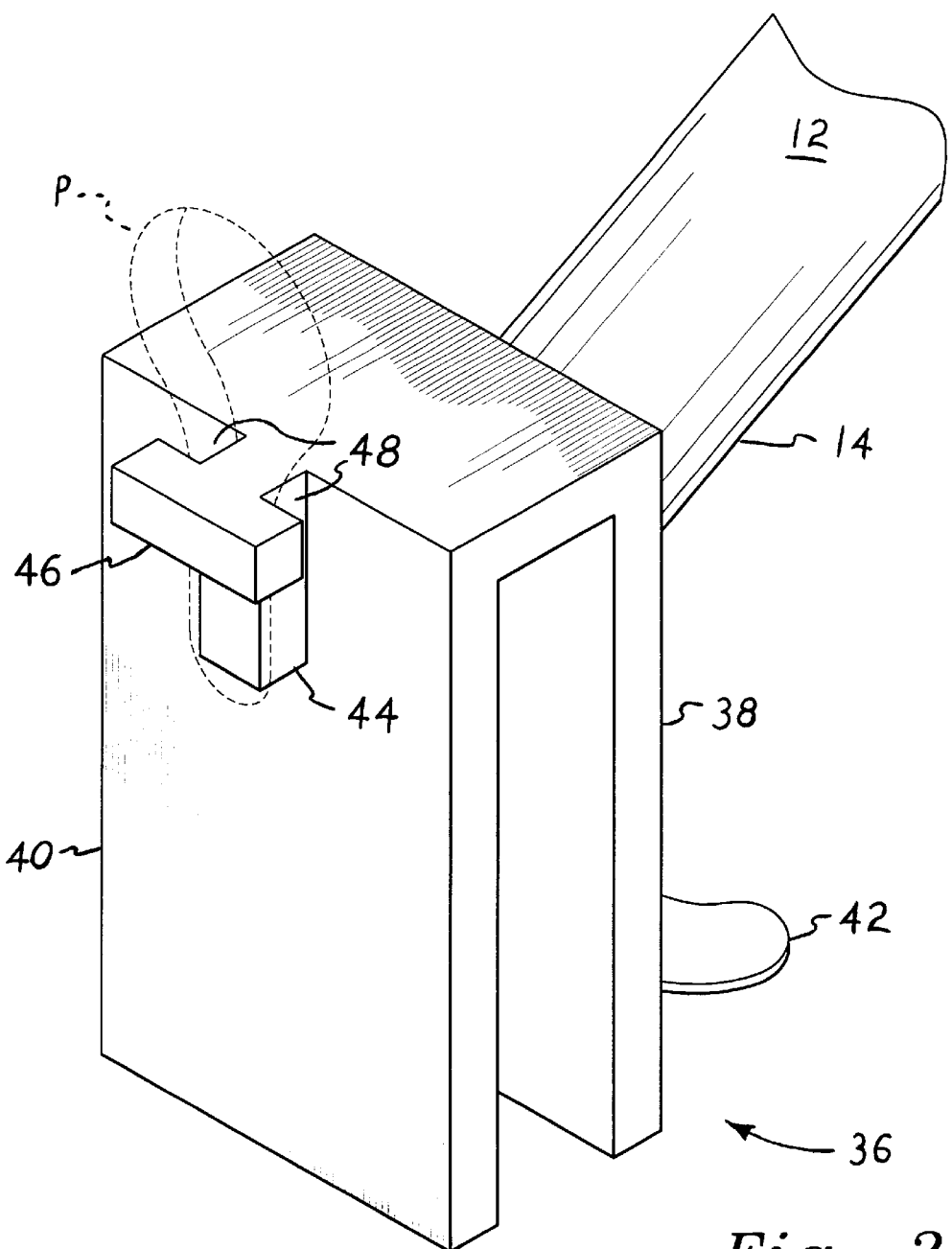
FIG. 3 is a detailed perspective view of the attachment end fitting of the present tool, showing details thereof.

The means for temporarily and removably securing the attachment end 14 of the rod 12 to the tandem axle wheel unit W of the trailer T, is shown in detail in FIG. 3 of the drawings. The distal attachment end 14 of the rod 12 includes an adjustable clamp 36 extending therefrom, with the clamp 36 having a first jaw 38 affixed (welded, etc.) to the distal end 14 of the rod 12, and an opposite second or distal jaw 40 spaced apart from the first jaw 38. A winged threaded clamping bolt 42 is adjustably installed through a passage in the first jaw 38, and serves to secure the clamp 36 to the tandem axle subframe F for using the tool 10.

In many trailers, the tandem lock pin release handle H rides in a generally keyhole shaped slot or passage P formed through the side of the tandem subframe F. FIG. 1 shows the general configuration of the structure, including the passage P through which the handle H passes, with FIG. 3 illustrating the slotted passage P in broken lines. The second or distal jaw side 40 includes a generally T-shaped key extending therefrom, formed of a first rectangular block 44 disposed essentially parallel to the second jaw side 40, with a second rectangular block 46 disposed across the first block 44 and normal thereto. This arrangement defines a channel 48 to each side of the first block 44 and between the lateral extensions of the second block 46 and the face of the second jaw side 40.

The attachment end of clamp 36 is secured to the slotted release handle passage P by inserting the second transverse block 46 through the wider upper portion of the passage P and dropping the assembly downwardly into the narrower bottom portion of the keyhole shaped slot P, with the first block 44 gripped by the narrow sides of the bottom of the slot P and the second block 46 extending across the back of the narrow sides of the bottom of the slot P. In this manner, the attachment end of clamp 36, and thus the remainder of the tool 10, cannot turn within the slot P due to the elongate first block 44 being captured within the narrow bottom portion of the slot P, and cannot pull out of the slot P due to the transverse second block 46 extending beyond the sides of the narrower portion of the slot P, generally as shown in FIG. 3.

When a trucker needs to reposition the tandem axle wheel unit W on a trailer T, the present tool 10 is secured to the subframe F of the trailer T in a position to exert a pull on the release handle H, generally as shown in FIG. 1 of the drawings. The clamp end 36 of the tool 10 may be secured to the subframe F by clamping the jaws 38 and 40 to an edge of the subframe F using the clamping bolt 42, or may be secured by raising the release pin handle H slightly and passing the transverse second block 46 of the key through the larger diameter upper portion of the handle passage P, and dropping the assembly downwardly to rest in the lower portion of the passage with the release pin handle R riding atop the assembly, generally as described above and shown in FIG. 3.

At this point, the trucker passes the ring 28 of the spring 24 around the release pin handle H, and extends the telescoping tubular portion 20 of the tool 10 outwardly (i.e., away from the subframe F of the trailer T) to exert a tensile pulling force on the handle H by means of the spring 24. The extended length of the tool 10 may be locked as desired when the desired pulling force has been reached for the spring 24, by twisting the handle 22 slightly to engage the pin 30 in the adjusting end 16 of the rod 12 in the desired detent 34 of the elongate slot 32 of the tube 20, thereby locking the assembly in the desired position. The trucker then returns to the cab of the truck and moves the truck and trailer rig slightly to release any shear pressure on the tandem unit lock pins, with the tension of the spring 24 on the handle H releasing the locking assembly when the shear pressure is relieved.

However, once the locking pins have been released, the driver still cannot determine easily from the cab, precisely how much to move the tractor and trailer relative to the tandem axle assembly in order to reposition the trailer relative to the tandem unit as desired. The trucker must still leave and return to the cab, perhaps several times, to check on the position of the tandem wheel unit to see if it is positioned close to the desired location so the locking pin handle may be released to engage the pins with some additional slight movement. Accordingly, the present invention also provides locator means for indicating the repositioning of the tandem axle unit to the desired predetermined position.

The locator device 50 comprises a highly visible indicator 52 (a reflector, etc.) which is attached to one end of an elongate flexible tether 54 (string, cord, leather or plastic thong, etc.). The opposite end of the tether 54 is secured to a trailer attachment device, comprising a clamp 56 (FIG. 1), spring clip 58 and magnet 60 (FIGS. 2 and 4), or other suitable means for temporarily and removably securing the locator 50 to the trailer T. The clamp 56 or clip 58 may be used with trailers T where non-ferrous metals (aluminum, etc.) are used, and where a flange or the like extends from the lower side of the trailer T. Where ferrous metals (steel, etc.) are used in the construction of the trailer T, e.g., along the edges of the trailer box for construction of the framework, the magnet 60 may be used to temporarily and removably secure the locator assembly to the trailer T.

Figure 4:
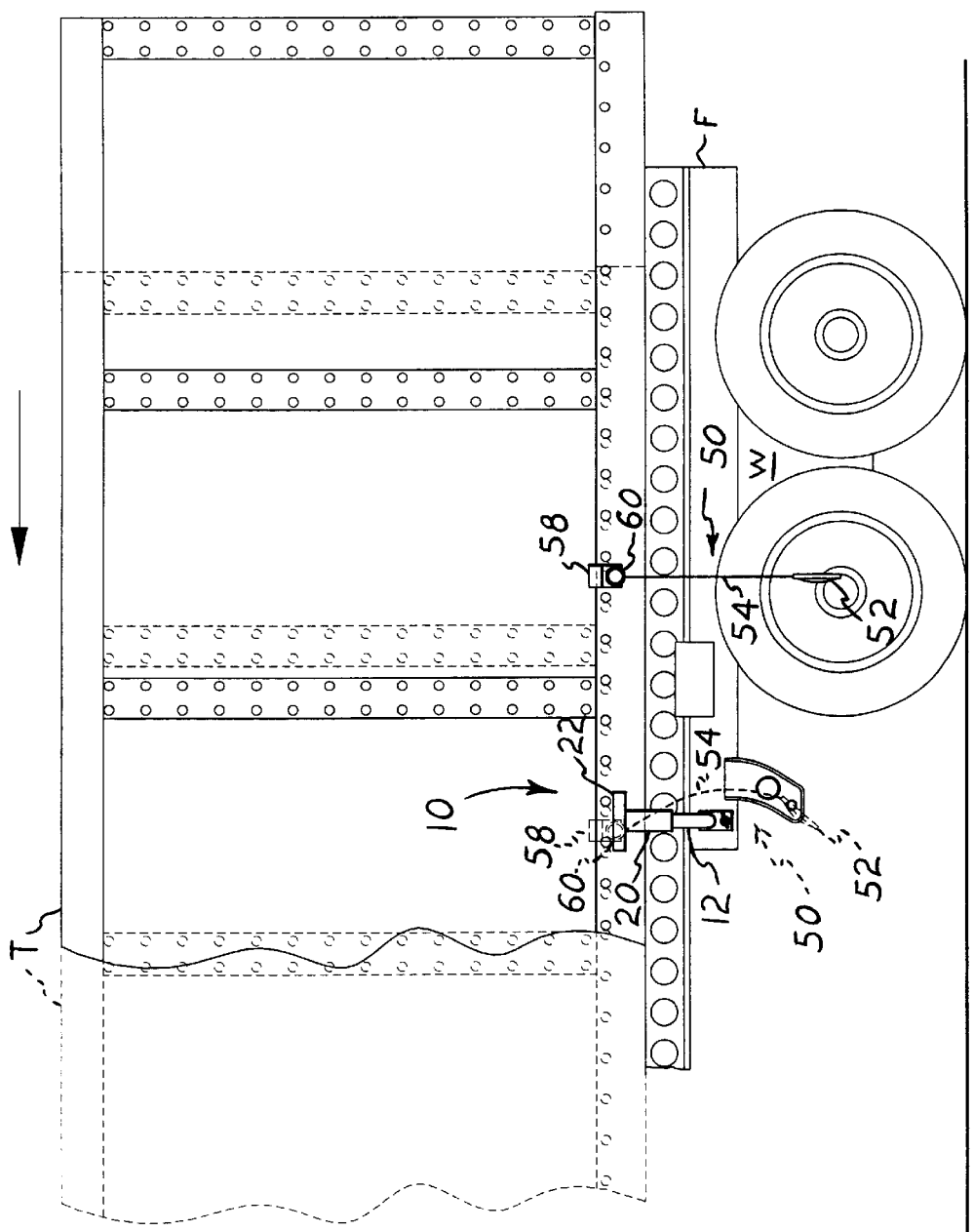
FIG. 4 is a side elevation view of a trailer, showing the present puller and locator tool installed on the tandem axle unit thereof and showing the adjustment of the tandem axle unit and operation of the locator of the present tool.

The locator assembly 50 is used by attaching it to the trailer T by means of the clip 56, clamp 58, or magnet 60, at a distance from the tool 10 handle which is equal to the distance which the tandem assembly W is to be adjusted relative to the trailer T. As an example, let us assume that the tandem assembly W is to be repositioned rearwardly relative to the trailer T, by a distance of twenty four inches; FIG. 4 illustrates such a rearward repositioning of the tandem unit W.

The pin puller tool 10 is secured to the trailer subframe F to exert a pulling force on the locking pin release handle H, as described further above and shown in detail in FIG. 1 of the drawings. The locator unit 50 is then secured to the lower side or edge of the trailer T at a distance from the tool 10 equal to the distance which the tandem unit W is to be moved, e.g., twenty four inches rearwardly of the tool 10.

As the pin puller tool 10 is secured only to the tandem axle unit subframe F, and is not affixed or attached to the trailer T in any way during use, it will be seen that the tool 10 will remain stationary relative to the tandem wheel assembly W, but will move relative to the trailer T, when the wheel assembly W is being repositioned relative to the trailer T. On the other hand, the locator assembly 50 will remain stationary relative to the trailer T, as it is attached to the trailer, but will move forwardly relative to the subframe F of the tandem wheel assembly W to which the tool 10 is attached, as the trailer T is drawn forwardly during the repositioning of the tandem wheel assembly W.

As the locator assembly 50 was initially positioned twenty four inches rearwardly of the tool 10, it will be seen that when the trailer T is drawn forwardly a distance of twenty four inches relative to the tandem wheel unit W, thus repositioning the tandem unit W twenty four inches rearwardly from its original location, that the tether 54 of the locator assembly 50 will contact the tool 10 handle. This contact is readily seen from the cab of the truck tractor by the driver observing the operation in his left side mirror.

When the driver notes that the tether 54 has contacted the tool 10, he stops the truck, leaves the cab to remove the locator 50 from the trailer T and the tool 10 from the tandem axle subframe F, and notes any slight misalignment of the subframe F with the locking pins (there will likely be perhaps a half inch or so of misalignment, but the subframe F will be positioned very close to the desired position using the present locator 50). The trucker may then return to the cab, store the tool 10 and locator 50, maneuver the truck tractor and trailer T slightly in the desired direction to get the spring loaded locking pins to lock into position, and leave the cab one last time to verify visually that the locking pins have engaged as desired to lock the tandem axle wheel unit W in the new position relative to the trailer T.

Alternatively, the tether 54 may be made to be adjustable in length, as noted by the vertical adjustment arrow A of FIG. 2 and the free adjustment end 62 of the tether 54. The trucker may attach the locator device 50 immediately above the rod and tube assembly of the tool 10, so the tether 54 is just touching the tool 10. The length of the tether 54 may then be adjusted so the locator 52 is positioned a distance below the tool 10, equal to the distance which the tandem axle unit W is to be repositioned. As an example, if the tandem unit is to be repositioned eighteen inches rearwardly, the locator tether 54 may be positioned just rearwardly of the tool 10 and just touching the tool 10, with the indicator 52 suspended eighteen inches below the tool 10. As the trucker repositions the trailer, the tether 54 will be drawn over the tool 10, thus drawing the indicator 52 upwardly. When the trailer T has been moved the desired distance relative to the stationary tandem wheel assembly W, the indicator will have been drawn upwardly until it just contacts the tool 10. The trucker, observing this in the left side mirror, then stops the truck, removes the tool 10 from the tandem subframe F and the indicator 50 from the trailer T, and returns to the tractor cab to reposition the trailer T relative to the tandem assembly W as required, to engage the locking pins of the trailer T in the subframe F and lock the assemblies together.

It will be seen that the present pin puller and locator tool may be used with trailers incorporating other types of tandem wheel release mechanisms as well. For example, some trailers are equipped with a lever which must be pulled to release the tandem assembly from the overlying trailer frame. Such release levers generally do not extend outwardly from the side of the trailer, and thus will not trip or catch a locator secured to the side of the trailer to indicate the position of the tandem assembly.

Accordingly, the present tandem pin puller 10 may be secured to the tandem assembly by the means provided, to extend outwardly beyond the side of the trailer. The locator 50 is secured to the trailer as described further above, at a distance and direction from the pin puller tool 10 corresponding to the direction and distance desired for the adjustment of the position of the tandem relative to the trailer. Movement of the trailer relative to the tandem assembly causes the present pin puller tool 10 to contact the tether 54 of the locator assembly 50, alerting the driver of the truck as he observes the locator 50 from the cab during maneuvering to adjust the position of the tandem wheel assembly of the trailer.

Figure 5:
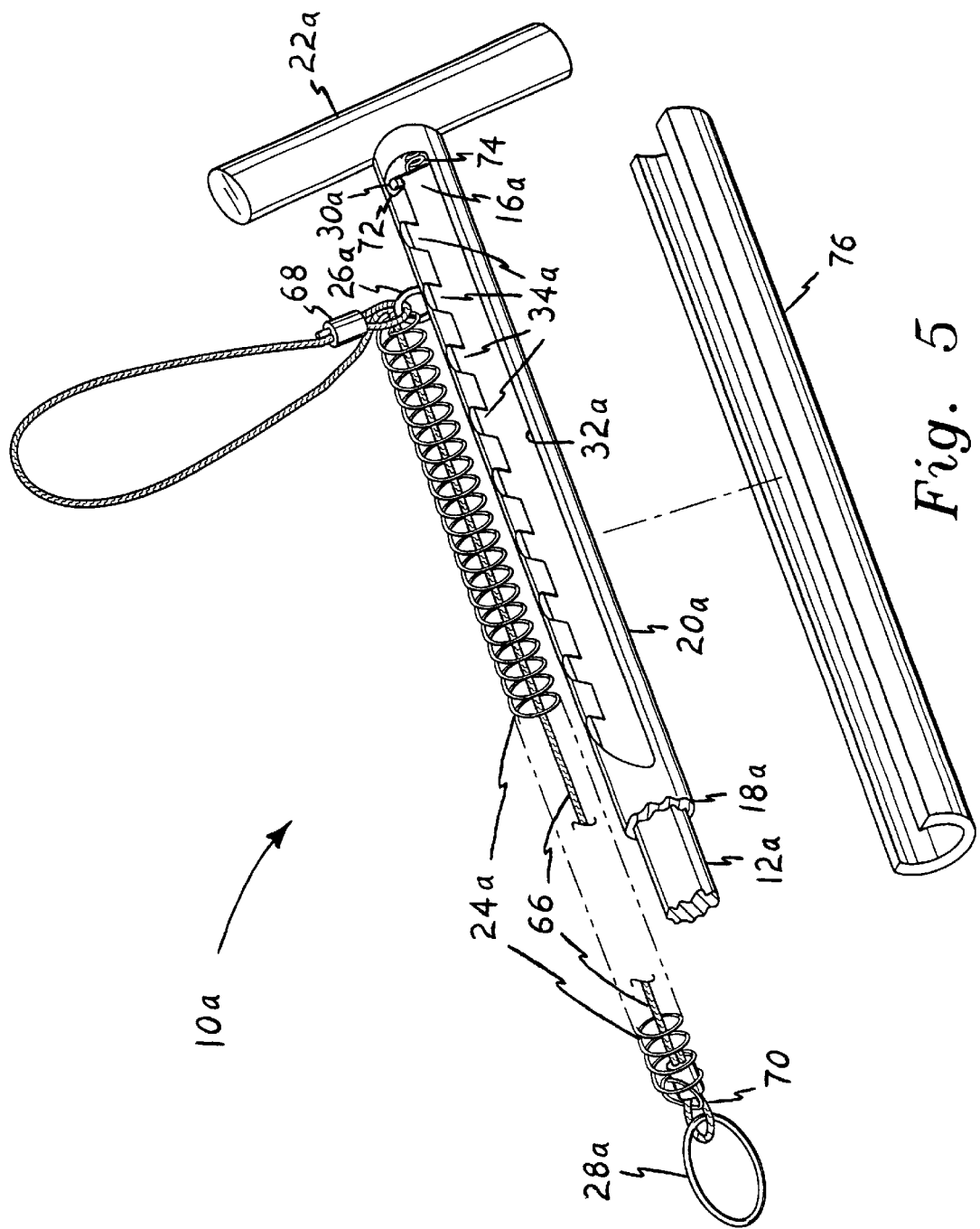
FIG. 5 is an exploded partial perspective view showing alternative embodiments and features of the present tool.

FIG. 5 illustrates an additional variation or embodiment of the present tandem pin puller tool, designated as tool 10a. The tool 10a includes a rod 12a with a distal tandem axle attachment end (not shown in FIG. 5, but essentially the same as the end 14 of the tool 10), with an adjustment end 16a which telescopes within the tube 20a. A T handle 22a extends across the end of the tube 20a, opposite the (broken away) rod opening end 18a of the tube 20a. A tension spring 24a is secured to an external attachment loop or point 26a on the tube 20a, with the opposite distal end of the spring 24a having a ring 28a for temporarily securing to the lock pin release handle of a tandem wheel assembly for a truck, essentially as shown in FIG. 1 of the drawings.

The tool embodiment 10a of FIG. 5 also includes a safety retaining cable 66, one end 68 of which is attached (e.g., swaged, etc.) to the spring attachment point 26a of the tube 20a and which passes through the center of the coil spring 24a, with its opposite end 70 being secured to the ring 28a at the distal end of the spring 24a. The retaining cable 66 assures that in the case of spring breakage or disassembly from the ring 28a, that no portion of the spring 24a can escape and become a dangerous projectile.

The rod 12a and tube 20a are telescopingly adjustable relative to one another, as noted above. The position of the rod 12a relative to the tube 20a may be locked by a pin 30a which extends radially from the adjustment end 16a of the rod 12a, and rides in a longitudinal slot 32a in the side of the tube 20a. A series of detents 34a are formed along at least one side of the slot 32a, for accepting the locking pin 30a of the rod 12a. This structure and its function are essentially the same as described further above for the corresponding components 12 through 34 of the tool 10.

However, the tool 10a of FIG. 5 also includes a rod retraction detent 72 adjacent the handle end of the slot 32a. This single rod retraction detent 72 is angled oppositely to the rod length adjustment detents 34a, and serves to retain the rod 12a in its fully retracted position in the tube 20a for compact storage of the tool 10a. A compression spring 74 installed in the handle end of the tube 20a urges the rod 12a toward an extended position, with the same pin 30a provided for locking the length of the rod 12a and tube 20a assembly also locking the assembly in a retracted state.

When a user of the tool 10a desires to extend the rod 12a, he/she need only compress the tube handle 22a slightly toward the distal end of the rod 12a to further compress the rod retraction retention spring 74, thereby releasing the retaining pin 30a pressure in the retaining slot 72. The handle 22a is then rotated slightly relative to the rod 12a to move the pin 30a from its retaining detent 72 and into the elongate slot 32a formed in the side of the tube 20a, whereupon the rod 12a may be telescopically adjusted relative to the tube 20a as desired, and locked into position in any suitable detent 34a. Retraction of the rod 12a into the tube 20a, and retention of the rod 12a in the tube 20a, is accomplished essentially by reversing the above operation.

It will be seen that the edges of the slot 32a, with its detents 34a and 72 and pin 30a, results in a number of sharp edges and potential "pinch points" for a person using the present tool 10 or 10a. Accordingly, a protective sleeve 76 may be installed over the channel or slot 32a, and its various detents 34a and 72, in order to prevent accidental insertion of the hand or fingers into the slot 32a and possible pinching of the skin. The sleeve 76 may be formed of a length of smooth, flexible plastic material, split along one side in order to allow it to be opened for lateral installation over the tube 20a of the tool 10a. It will also be noted that any of the additional features of the tool 10a, e.g., the spring retaining cable 66, the retraction locking detent and spring 72 and 74, and the safety sleeve 76, may be provided for the tool 10 of FIGS. 1 and 2 of the drawings.

In summary, the present pin puller and locator tool assembly provides a much needed means for a trucker to reduce greatly the time and effort otherwise required in adjusting the position of a tandem axle assembly on a semitrailer. The present tool is easily installed on the tandem axle subframe, and contacts and secures to only the subframe itself, rather than having any attachment to the trailer. In contrast, the indicator assembly of the present invention secures only to the trailer, and does not contact the tandem axle assembly or subframe at any time. The interaction between the present tool and indicator, however, provides an accurate indication of the repositioning of the tandem axle unit relative to the trailer, without any requirement that the driver leave the cab periodically to check.

The present tool also provides great versatility, in addition to its functions as a release pin puller and locator. The present tool may also be used to pull the conventional release mechanism for the fifth wheel coupling or hitch, for securing the semi trailer to the truck tractor. A release hook 64 may be provided on the rod opening end 18 of the tube 20, as shown in FIG. 2 of the drawings, for reaching beneath the forward end of a coupled trailer and catching the release mechanism for releasing the trailer. The hook 64 is also handy for breaking seals used on door latch mechanisms in semitrailers, for assuring that the cargo or freight contained therein is not subject to theft or damage. Oftentimes, a driver must access the interior of a trailer, and use of the hook 64 of the present tool allows the driver to avoid possible injury to his/her hands in breaking the seal. The present tool may also be used as a "tire thumper," in the manner of a tire iron or the like, for a trucker to get at least a rough idea of tire inflation in dual wheel assemblies.

Thus, the present tool and indicator provide the versatility and function of several trucking tools of the prior art, combined into a single assembly. The versatility and multiple functions of the present tool, along with the labor saving provided by the locator device, wherein the trucker need not leave the cab repeatedly during the repositioning of the trailer and tandem axle assembly, will be much appreciated by drivers in the trucking industry.

It is to be understood that the present invention is not limited to the embodiments described above, but encompasses any and all embodiments within the scope of the following claims.

I claim:

1. A portable tool for remotely releasing a lock pin release handle of an adjustable tandem axle unit on a semitrailer, comprising:

an elongate rod having a distal tandem axle attachment end and an adjustment end opposite said attachment end;

an elongate tube having a distal rod opening end and a handle end opposite said rod opening end, with said rod adjustably telescoping within said tube;

means for temporarily and removably securing said attachment end of said rod to the tandem axle unit of the trailer;

means for adustably securing said adjustment end of said rod within said tube;

a tension spring extending from an external attachment point on said tube; and said spring having a distal end including means for temporarily and removably attaching said spring to the lock pin release handle.

2. The tool according to claim 1, further including locator means for indicating the relocating of the tandem axle unit to a predetermined position, comprising:

a highly visible indicator;

trailer attachment means for removably connecting said indicator to the semitrailer at a predetermined location corresponding to the predetermined position of the tandem axle unit; and an elongate, flexible tether connecting said indicator and said trailer attachment means, with said tether contacting said tube and producing movement of said indicator when the tandem axle unit is relocated to the predetermined position.

3. The tool according to claim 1, wherein said means for adjustably securing said adjustment end of said rod within said tube comprises a slot formed longitudinally along said tube, said slot including a plurality of detents formed therein, and said rod including a radially disposed pin adjustably engageable within one of said detents of said slot in order to adjust the length of the tool.

4. The tool according to claim 1, including means for securing said rod in a fully retracted position within said tube for compact storage thereof.

5. The tool according to claim 1, wherein said means for temporarily and removably securing said attachment end of said rod to the tandem axle unit of the trailer comprises an adjustable clamp having a distal side with a T-shaped key extending therefrom for removably engaging a slot in which the lock pin release handle rides.

6. The tool according to claim 1, further including a release hook extending from said rod opening end of said tube for operating the release mechanism for the fifth wheel trailer hitch of a truck tractor.

7. The tool according to claim 1, further including:
  spring safety retention means for retaining said tension spring; and
  a protective sleeve disposed about said tube.

8. A portable tool for remotely releasing a lock pin release handle of an adjustable tandem axle unit on a semitrailer, comprising:
  an elongate rod having a distal tandem axle attachment end and an adjustment end opposite said attachment end;
  an elongate tube having a distal rod opening end and a handle end opposite said rod opening end, with said rod adjustably telescoping within said tube;
  means for temporarily and removably securing said attachment end of said rod to the tandem axle unit of the trailer;
  a tension spring extending from an external attachment point on said tube;
  said spring having a distal end including means for temporarily and removably attaching said spring to the lock pin release handle; and
  locator means for indicating relocation of the tandem axle unit to a predetermined position.

9. The tool according to claim 8, wherein said locator means comprises:
  a highly visible indicator;
  trailer attachment means for removably connecting said indicator to the semitrailer at a predetermined location corresponding to the predetermined position of the tandem axle unit; and
  an elongate, flexible tether connecting said indicator and said trailer attachment means, with said tether contacting said tube and producing movement of said indicator when the tandem axle unit is relocated to the predetermined position.

10. The tool according to claim 8, further including means for adjustably securing said adjustment end of said rod within said tube, the adjustably securing means comprising:
  a slot formed longitudinally along said tube, said slot including a plurality of detents formed therein; and
  a pin radially disposed on said rod, the pin being adjustably engageable within one of said detents of said slot in order to adjust the length of the tool.

11. The tool according to claim 8, wherein said means for temporarily and removably securing said attachment end of said rod to the tandem axle unit of the trailer comprises an adjustable clamp having a distal side with a T-shaped key extending therefrom for removably engaging a slot in which the lock pin release handle rides.

12. The tool according to claim 8, further including means for securing said rod in a fully retracted position within said tube for compact storage thereof.

13. The tool according to claim 8, further including a release hook extending from said rod opening end of said tube for operating the release mechanism for the fifth wheel trailer hitch of a truck tractor.

14. The tool according to claim 8, further including:
  spring safety retention means for retaining said tension spring; and
  a protective sleeve disposed about said tube.

15. A locator for indicating a relocated position of an adjustable tandem axle unit on a semitrailer to a predetermined position, with the trailer including a lock pin release handle movably extending from the tandem axle unit, comprising:
  an elongate locator contact temporarily and removably secured to the lock pin release handle;
  a highly visible indicator;
  trailer attachment means for removably connecting said indicator to the semitrailer at a predetermined location corresponding to the predetermined position of the tandem axle unit; and
  an elongate, flexible tether connecting said indicator and said trailer attachment means, with said tether contacting said locator contact and producing movement of said indicator when the tandem axle unit is relocated to the predetermined position.

16. The locator of claim 15, wherein said locator contact comprises:
  an elongate rod having a distal tandem axle attachment end and an adjustment end opposite said attachment end;
  an elongate tube having a distal rod opening end and a handle end opposite said rod opening end, with said rod adjustably telescoping within said tube;
  means for temporarily and removably securing said attachment end of said rod to the tandem axle unit of the trailer; and
  a tension spring extending from an external attachment point on said tube;
  said spring having a distal end including means for temporarily and removably attaching said spring to the lock pin release handle.

17. The locator of claim 15, wherein said indicator comprises a reflector.

18. The locator of claim 15, wherein said tether has an adjustably variable length.

19. The locator of claim 15, wherein said trailer attachment means comprises a spring clip.

20. The locator of claim 15, wherein said trailer attachment means comprises a magnet.

* * * * *